E. B. RIPLEY.
Animal-Trap.
No. 200,221. Patented Feb. 12, 1878.
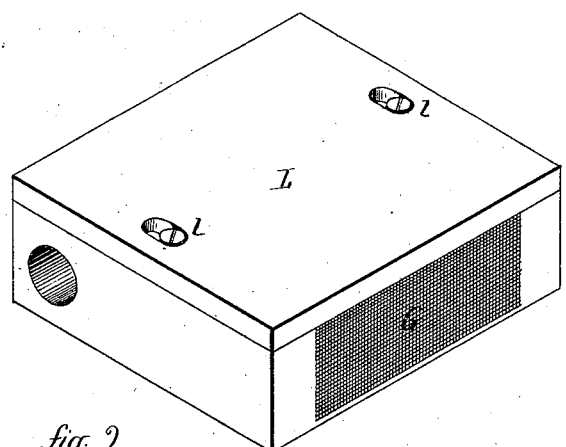
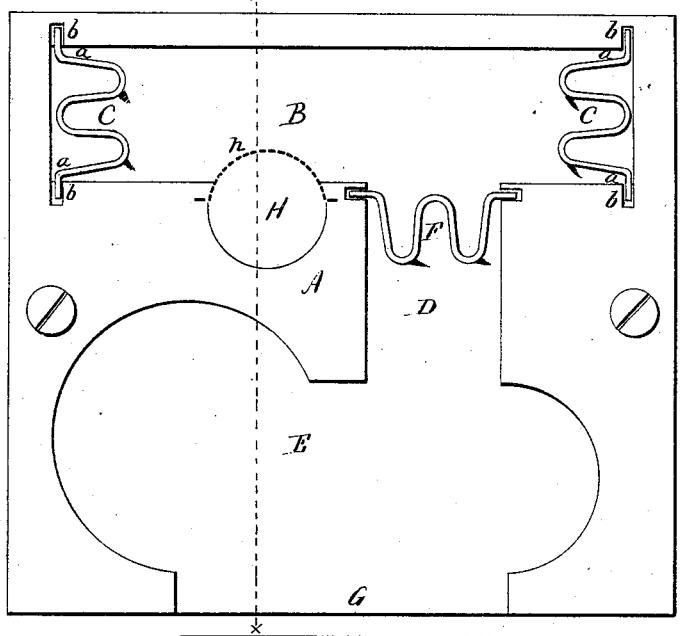
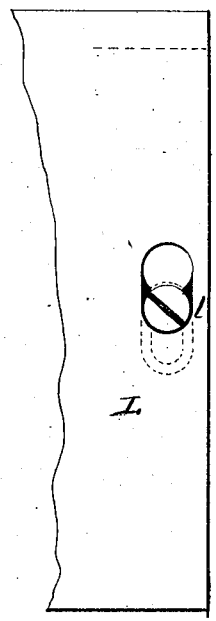
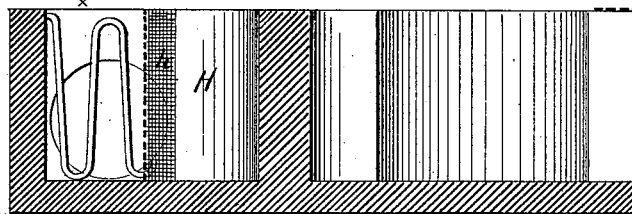
Witnesses.
Eugene B. Ripley
Inventor
By Atty.

UNITED STATES PATENT OFFICE.

EUGENE B. RIPLEY, OF UNIONVILLE, CONNECTICUT.

IMPROVEMENT IN ANIMAL-TRAPS.

Specification forming part of Letters Patent No. 200,221, dated February 12, 1878; application filed November 22, 1877.

*To all whom it may concern:*

Be it known that I, EUGENE B. RIPLEY, of Unionville, in the county of Hartford and State of Connecticut, have invented a new Improvement in Animal-Trap; and I do hereby declare the following, when taken in connection with the accompanying drawings and the letters of reference marked thereon, to be a full, clear, and exact description of the same, and which said drawings constitute part of this specification, and represent, in—

Figure 1, perspective view; Fig. 2, top or plan view, with the cover removed; Fig. 3, transverse section on line X X; Fig. 4, partial view of the top and cover.

This invention relates to an improvement in traps for catching mice or other small animals, and is of the class known in the market as "catch-'em-alive," the object being to construct the trap in a simple, cheap, and yet durable form, and to so arrange the bait that while it may attract the animal it cannot be destroyed or removed by him, but, after taking one, remains undisturbed to attract others; and the invention consists in the details of construction and combination of parts, as hereinafter described, and more particularly recited in the claim.

Preferably, the trap is made from a solid block, A. Near one edge of the block a passage, B, is made, sufficiently large to admit the animal. Said passage is closed at each end by a gravity-gate, C—that is to say, a gate hinged above, so as to be raised by the animal entering, and immediately fall behind him after he has passed in, (or upon his back,) and prevent withdrawal after a partial entrance. These gates are made from wire bent up and down, with two ends, *a*, turning, the one to the right and the other to the left, into a recess, *b*, cut in the wood, and these ends are sustained in that position by the top, which is secured upon the block; or they may be otherwise secured, the essential feature being the recesses in the wood and ends turned therein, as a means for securing the gates and forming a hinge therefor.

From the passage B a transverse passage, D, leads to a receiving-chamber, E; and in the passage D a fall or hinged gate, F, substantially the same as the gate C, is arranged, so that the animal, passing from the passage B with the hope of escaping, will go into the receiving-chamber E. This chamber E has an opening, covered by wire-netting or similar protection G, which leaves the passage B clear for a second animal to unsuspectingly enter.

At one side of the passage B a recess, H, is cut, and inclosed by a wire-netting, *h*. The bait is dropped into this recess when the cover is removed, and is exposed through the netting, so as to be seen and snuffed by the animal and attract it to the passage B, from whence he cannot return, neither can he touch the bait.

The whole is inclosed by a cover, L, secured by screws or headed studs *l*. These screws pass through elongated slots in the cover, the slots being sufficiently large at one end to pass over the head, and then contracted, so as to pass beneath the head. Hence, to apply the cover, first set it over the head of the screws, then move it until the heads pass onto the cover at the sides of the slots, which secures it in place; and to remove it, reverse the operation.

This method of securing the cover is not only cheap in its construction, but as it may be placed either side up, if the cover warps in one direction it may be applied the other or concave side up, and always be tight and secure.

It is not to be understood that a claim to invention is here broadly made for a trap having a gravity fall or gate, under which the animal may freely pass, and so that the gate will fall behind it, as such is a well-known construction; but

What is claimed as new, and desired to be secured by Letters Patent, is—

In an animal-trap, the combination of the passage B, gravity-gate C at each end of said passage, the receiving-chamber E, passage D, gravity-gate F in said passage, and the reversible cover, constructed with elongated slots and corresponding headed studs on the body, and so that the cover may be applied either side up, substantially as described.

EUGENE B. RIPLEY.

Witnesses:
JOHN E. EARLE,
H. A. KITSON.